United States Patent [19]

Iiyori et al.

[11] Patent Number: 5,173,885
[45] Date of Patent: Dec. 22, 1992

[54] MAGNETO-OPTICAL RECORDING MEDIUM AND SYSTEM FOR USE WITH SHORT WAVELENGTH LIGHT

[75] Inventors: Hideo Iiyori; Shinji Takayama, both of Mitaka, Japan

[73] Assignee: International Business Machines Corporation, Armonk, N.Y.

[21] Appl. No.: 755,718

[22] Filed: Sep. 6, 1991

[30] Foreign Application Priority Data

Oct. 5, 1990 [JP] Japan .................. 2-266606

[51] Int. Cl.⁵ .......................................... G11B 13/04
[52] U.S. Cl. ...................................... 369/13; 360/59; 360/114; 428/694
[58] Field of Search ............... 369/13; 360/59, 114; 365/122; 428/694, 900

[56] References Cited

U.S. PATENT DOCUMENTS

| | | | |
|---|---|---|---|
| 4,998,231 | 3/1991 | Watanabe et al. | 360/59 |
| 5,016,232 | 5/1991 | Tadokoro et al. | 369/13 |
| 5,030,512 | 7/1991 | Kato et al. | 428/694 |

OTHER PUBLICATIONS

Ito et al, "Magnetic and magneto-optical properties of Nd alloy multilayers", Digest of the 13th annual conference on magnetics in Japan (1989), p. 325.

McGuire et al, "Magneto-optical properties of Nd-Co and Nd-Fe alloys", J. Appl. phys. 61(8), Apr. 15, 1987, pp. 3352-3354.

"Magnetic and Magneto-Optical Properties of Co/TbFeCo Exchange Coupled Films", H. Wakabayashi, et al., Digest of the 13th annual conference on magnetics in Japan (1989), p. 326.

*Primary Examiner*—Hoa T. Nguyen
*Attorney, Agent, or Firm*—Douglas R. Millett

[57] ABSTRACT

A magneto-optical medium is comprised of three layers. The first layer is made of a rare earth-transition metal amorphous film from one to twenty nanometers thick. The second layer is comprised of a rear earth-transition metal amorphous film or crystalline film and is one to twenty nanometers thick. The third layer is comprised of a rare earth-transition metal amorphous film and is not less than two nanometers thick. The resulting medium has a sufficiently large magneto-optical effect even at short wave lengths and is perpendicular magnetized film. A data storage system including the magneto-optical medium therein.

24 Claims, 5 Drawing Sheets

MAGNETO-OPTICAL RECORDING MEDIUM AND SYSTEM FOR USE WITH SHORT WAVELENGTH LIGHT

BACKGROUND OF THE INVENTION

1. Field of the Invention

This invention relates to a magneto-optical recording medium having a large magneto-optical effect when exposed to short-wavelength light and hence is suitable for high-density recording.

2. Description of the Prior Art

Magneto-optical recording has been put to practical use as an optical recording method that permits rewriting. Heretofore, single-layered rare earth-transition metal amorphous films having a strong magnetic anisotropy in a direction perpendicular to the film surface have been employed as magneto-optical recording films.

In particular, TbFeCo alloy amorphous films are being researched and developed for practical use. An increase in the recording density is a major aim in the field of magneto-optical recording. Shortening of the wavelength of writing/reading light is currently being studied as a method of achieving this. To increase the magneto-optical recording density in the future, it is indispensable to develop magneto-optical materials that have a high magneto-optical effect (the Kerr effect and Faraday effect) at short wavelengths. With most conventional TbFeCo alloy amorphous films, the magneto-optical effect tends to decrease monotonically as the wavelength of a laser beam becomes shorter, and sufficiently large Kerr rotation or Faraday rotation is not obtained at short wavelengths, which results in a drastic decrease in the output when it is read out by a laser beam.

On the other hand, there is a known amorphous film that is an alloy of a transition metal consisting mainly of Co and Fe and of rare earth elements consisting mainly of Nd and Pr (see, for instance, T. R. McGuire et al., "Magneto-optical Properties of Nd-Co and Nd-Fe Alloys," J. Appl. Phys. 61(8), Apr., 15, 1987, pp. 3352-3354). This film, although it has a large magneto-optical effect at short wavelengths, has in-plane magnetization but not perpendicular magnetization, and cannot realize high-density recording.

A double-layered film formed by laminating a Nd alloy rare earth-transition metal amorphous film and a TbFeCo amorphous film to utilize exchange coupling between them is proposed by Ito, et al. in "Magnetic and Magneto-optical properties of Nd alloy multilayers," Digest of the 13th annual conference on magnetics in Japan (1989), p. 325. However, the double-layered film disclosed therein has a Kerr rotation angle of 0.3 degrees at a wavelength of 400 nm, and does not fully realize intrinsic Kerr rotation of Nd alloys.

Among materials other than amorphous materials, crystalline Co and Fe are known to have large magneto-optical effects at short wavelengths. However, they are not available in the form of perpendicularly magnetized films and have received almost no attention heretofore as magneto-optical materials.

Here again, attempts have been made to obtain a perpendicular-magnetized film by laminating an in-plane magnetized film Co and a perpendicular-magnetized film TbFeCo to utilize exchange coupling between two films (see, H. Wakabayashi, et al., "Magnetic and magneto-optical properties of Co/TbFeCo exchange coupled films," Digest of the 13th annual conference on magnetics in Japan (1989), p. 326). However, in order to obtain a double-layered film that has good squareness according to the proposed approach, the thickness of Co must be 25 Å or less. Therefore, this film can have only a low Kerr rotation angle derived from the TbFeCo film alone at short wavelengths.

SUMMARY OF THE INVENTION

It is therefore an object of the invention to provide a magneto-optical recording medium that has a sufficiently large magneto-optical effect even at short wavelengths, reorients the magnetization in a direction perpendicular to the film surface, and permits high-density recording.

A magneto-optical medium according to the invention is composed of a first magnetic layer in the form of a rare earth-transition metal amorphous film including at least one rare earth element selected from a group consisting of Tb, Dy, and Gd and including at least one transition metal element selected from a group consisting of Fe and Co; a second magnetic layer in the form of either a rare earth-transition metal amorphous film including at least one rare earth element selected from a group consisting of Nd and Pr and including at least one transition metal element selected from a group consisting of Fe and Co, or a crystalline film including at least one element selected from a group consisting of Fe and Co; and a third magnetic layer in the form of a rare earth-transition metal amorphous film including at least one rare earth element selected from a group consisting of Tb, Dy, and Gd and including at least one transition metal element selected from a group consisting of Fe and Co, those layers being laminated successively, with the first layer being the first to be penetrated by light.

The thickness of the first layer is required to be not more than 20 nm, to allow a sufficient amount of light to be transmitted and make to the best use of the excellent magneto-optical effect of the second layer, and not less than 1 nm, to exert magnetic exchange coupling on the second layer and thus to reorient a sufficient strength of magnetization perpendicularly.

The thickness of the second layer is required to be not more than 20 nm, to allow magnetic exchange coupling to be received from the first layer and the third layer, and not less than 1 nm, to ensure an excellent magneto-optical effect at short wavelengths.

The thickness of the third layer is required to be not less than 2 nm, or preferably not less than 5 nm, to allow a sufficient strength of magnetic exchange coupling to be exerted. From the viewpoint of the cost, the upper limit is, preferably, 200 nm.

The preferable Curie temperatures of the first and third layers are required to be not more than 300° C., making them suitable for writing under heat by a laser beam. The more preferable temperature range is not less than 100° C. and not more than 200° C.

The preferable composition of the second magnetic layer is represented by the formula $(A_{1-a}B_a)_x(Fe_{1-b}Co_b)_yT_z$, where A is at least one element selected from a group consisting of Nd and Pr, B is at least one element selected from a group consisting of Tb, Dy, and Gd, T is at least one element selected from a group of transition metals for improving anticorrosion, $0 \leq a \leq 0.9$, $0 \leq b \leq 1$, $0 \leq x \leq 40$, $0 \leq z \leq 10$, and $x+y+z=100$.

Examples of the first and third magnetic layers are TbFeCo, GdTbFeCo, DyTbFeCo, DyFeCo, and DyGdFeCo films.

The group T of transition metal elements consists of Ti, Zr, V, Nb, Ta, Cr, Mo, W, Pd, Pt, Au, and Al, which are known to improve anticorrosion. These elements may be included in the first or third layer. Since excessive addition of these elements would destroy the expected properties of the respective magnetic films, the additional amount, in either film, must be within 10 atomic percentage points.

For a fuller understanding of the nature and advantages of the present invention reference should be made to the following detailed description taken into conjunction with the accompanying drawings.

DESCRIPTION OF THE PREFERRED EMBODIMENTS

An embodiment of the invention is explained below, with reference to the drawings.

Figure 1:
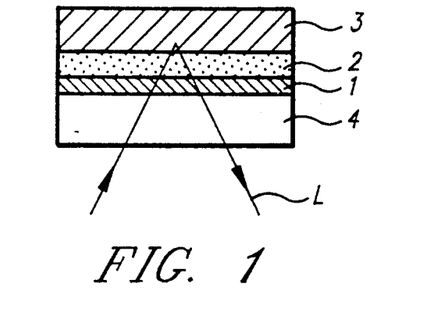
FIG. 1 is a cross-sectional view of the general construction of a magneto-optical recording medium.

FIG. 1 is a cross-sectional view of the general construction of a triple-layered structure consisting of a first layer 1, a second layer 2, and a third layer 3 made on a glass substrate 4. A laser beam L first penetrates the first layer of the trilayer film. All films in experimental examples referred to subsequently were made by a DC magnetron sputtering method.

Figure 2:
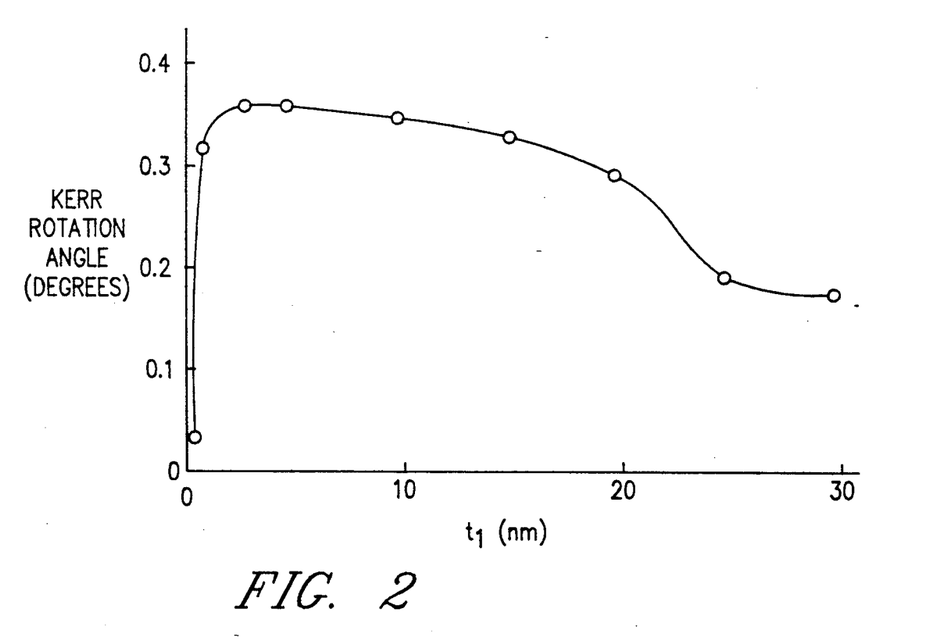
FIG. 2 is a graph showing the relationship between the thickness of the first layer and the Kerr rotation angle in a TbFeCo/NdCo/TbFeCo trilayer film.

Several samples were first made in which $Tb_{21}Fe_{75}Co_4$ (coercivity Hc=5 kOe, Curie temperature Tc=200° C.) amorphous films were used for the first and third layers and a $Nd_{20}Co_{80}$ amorphous layer for the second layer, with a constant thickness of 10 nm for the second layer, a constant thickness of 100 nm for the third layer, and a variable thickness $t_1$ for the first layer. FIG. 2 shows the values of the remanent Kerr rotation angle measured by a laser beam of wavelength 400 nm incident from the glass substrate. This figure shows that the first layer is required to have a thickness of not less than 1 nm and not more than 20 nm in order to obtain a Kerr rotation angle of 0.3 or more degrees, which is suitable for practical use.

Figure 3:
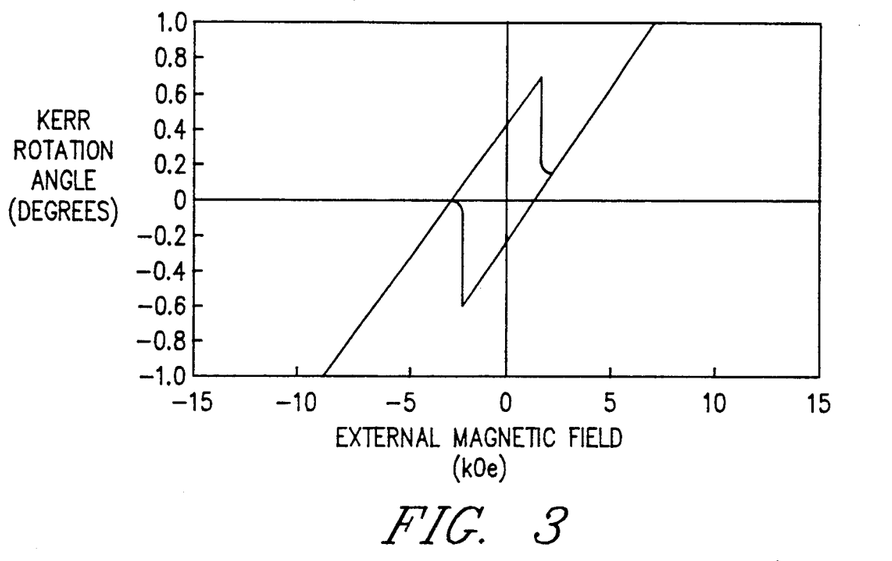
FIG. 3 is a graph showing the Kerr hysteresis curve of an example of such a trilayer film.

FIG. 3 shows a representative Kerr hysteresis loop measured by a laser beam of wavelength 400 nm incident from the glass substrate of a sample whose first layer is 5 nm thick. The figure shows that a perpendicular-magnetized film suitable for magneto-optical recording is obtained, showing an excellent squareness with a coercivity of 2 kOe.

Figure 4:
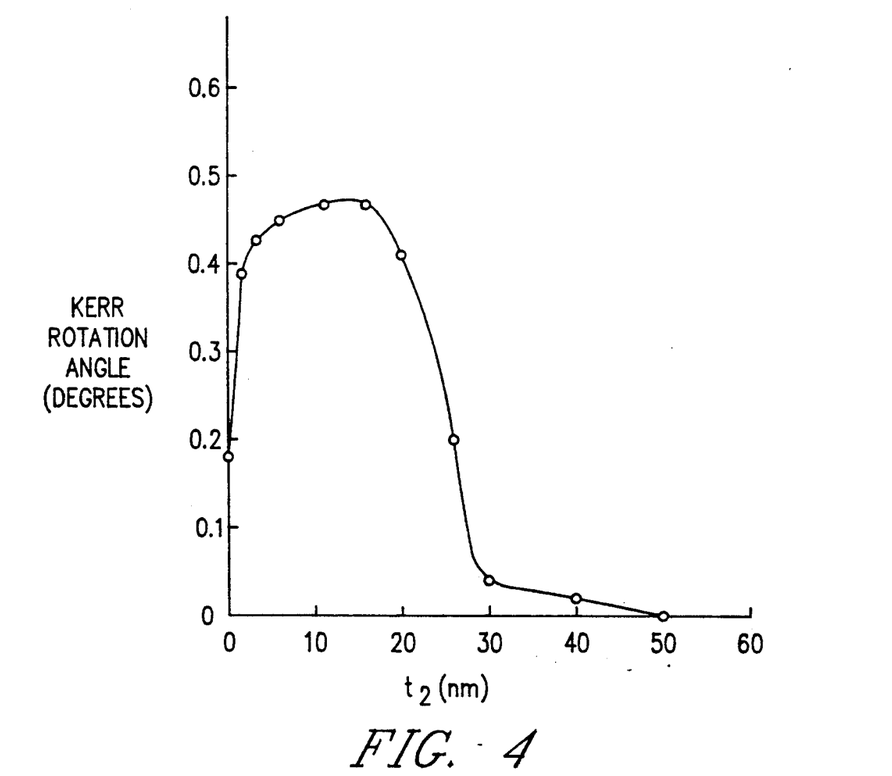
FIG. 4 is a graph showing the relationship between the thickness of the second layer and the Kerr rotation angle in a TbFeCoCr/NdFeCo/TbFeCo trilayer film.

Next, several kinds of samples were made in which a $Tb_{20}Fe_{45}Co_{29}Cr_6$ (coercivity Hc=7 kOe, Curie temperature Tc=350° C.) amorphous film was used as the first layer, a $Nd_{20}(Fe_{0.65}Co_{0.35})_{80}$ amorphous layer as the second layer, and a $Tb_{21}Fe_{75}Co_4$ amorphous film as the third layer, with a constant thickness of 5 nm for the first layer, a constant thickness of 100 nm for the third layer, and a variable thickness $t_2$ for the second layer. FIG. 4 shows the values of the remanent Kerr rotation angle measured by a laser beam of wavelength 400 nm incident from the glass substrate. The figure shows that a Kerr rotation angle of 0.3 or more degrees, suitable for practical use, is obtained when the range of thickness of the second layer is not less than 1 nm and not more than 20 nm.

Figure 5:
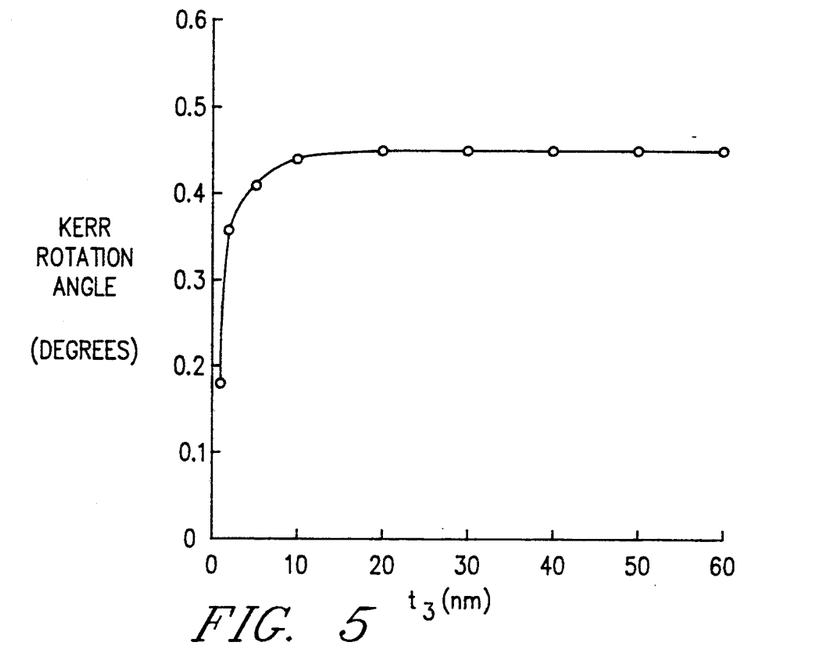
FIG. 5 is a graph showing the relationship between the thickness of the third layer and the Kerr rotation angle in a TbFeCoTa/PrFeCo/TbFeCoTa trilayer film.

Next, several kinds of samples were made in which $Tb_{24}Fe_{65}Co_6Ta_5$ (coercivity Hc=8 kOe, Curie temperature Tc=150° C.) amorphous films were used for the first and third layers and a $Pr_{20}(Fe_{0.5}Co_{0.5})_{80}$ amorphous layer for the second layer, with a constant thickness of 5 nm for the first layer, a constant thickness of 15 nm for the second layer, and a variable thickness $t_3$ for the third layer. FIG. 5 shows the values of the remanent Kerr rotation angle measured by a laser beam of wavelength 400 nm incident from the glass substrate. The figure shows that a Kerr rotation angle of 0.3 or more degrees, suitable for practical use, is obtained when the range of thickness of the third layer is not less than 2 nm.

For a triple-layered film with a first layer in the form of a 5-nm-thick $Tb_{19}Fe_{67}Co_{10}Nb_4$ film, a second layer in the form of a 10-nm-thick $Pr_{20}Fe_{24}Co_{56}$ film, and a third layer in the form of 50-nm-thick $Tb_{19}Fe_{67}Co_{10}Nb_4$ film, the Kerr rotation angle measured under the same conditions was 0.4 degrees, and the coercivity was 2 kOe. The Kerr hysteresis loop had excellent squareness.

Figure 6:
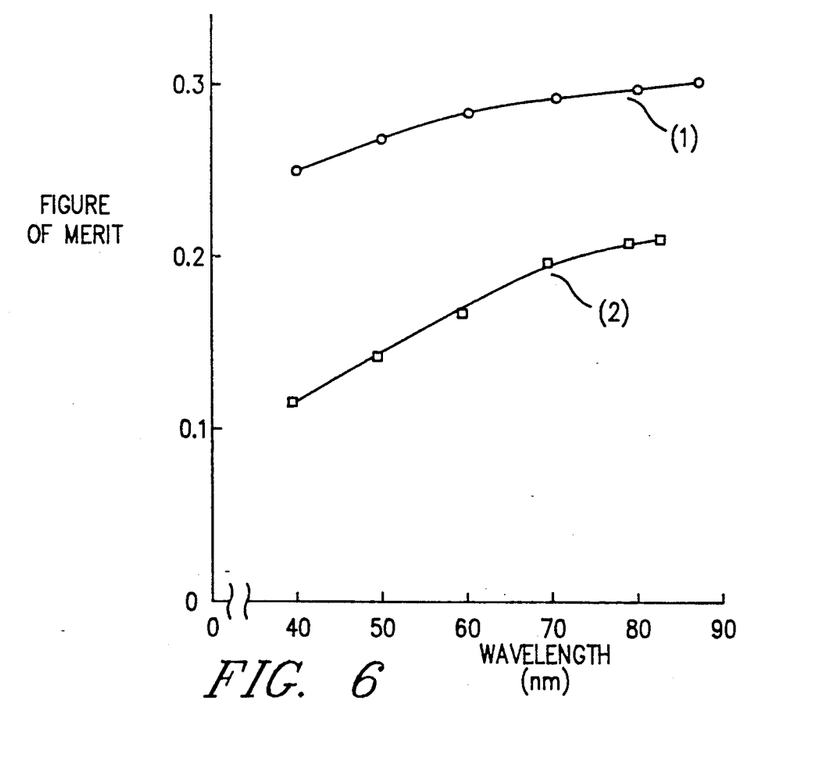
FIG. 6 is a graph showing the relationship between the incident light wavelengths and the figures of merit in a TbFeCo/NdCo/TbFeCo trilayer film and a TbFeCo single layer film.

FIG. 6 shows the figure of merit (the product of the square root of the reflection ratio and the Kerr rotation angle) of a triple-layered film of $Tb_{18}Fe_{49}Co_{33}$ (5 nm thick)/$Nd_{20}Co_{80}$ (10 nm thick)/$Tb_{18}Fe_{49}Co_{33}$ (100 nm thick) as a function of the wavelength of incident light (1). The figure also shows the figure of merit of a conventional $Tb_{25}Fe_{65}Co_{10}$ film for comparison (2). It is evident from the figure that the triple-layered film according to the invention has a higher figure of merit than the conventional material throughout the entire wavelength range, and is an excellent magneto-optical recording material.

The following explanation concerns experimental examples using crystalline Co, Fe, or an alloy of them as the second layer.

Figure 7:
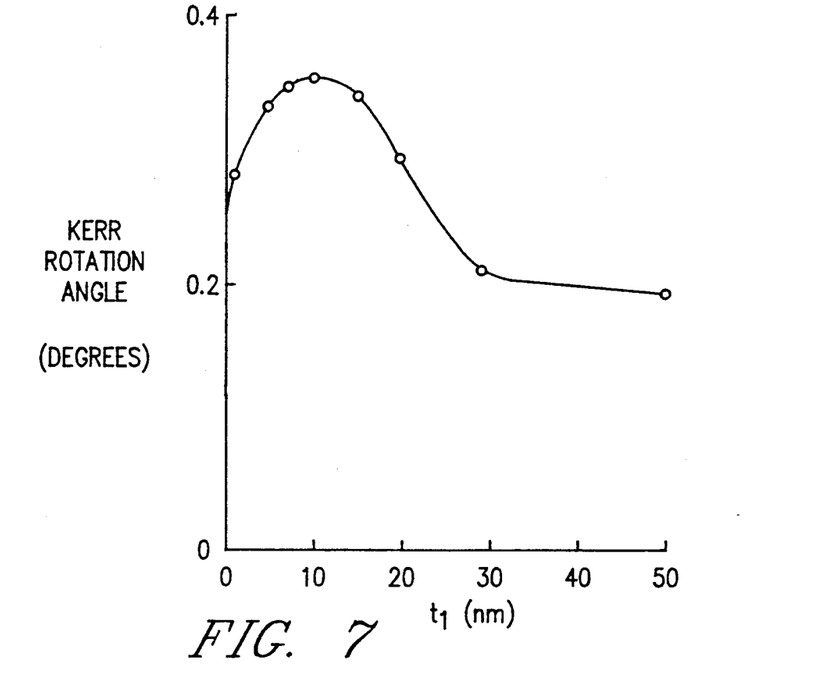
FIG. 7 is a graph showing the relationship between the thickness of the first layer and the Kerr rotation angle of a TbFeCo/Fe/TbFeCo trilayer film.

Several kinds of samples were first made, in which $Tb_{18}Fe_{49}Co_{33}$ amorphous films were used for the first and third layers and an Fe crystalline film for the second layer, with a constant thickness of 7 nm for the second layer, a constant thickness of 100 nm for the third layer, and a variable thickness $t_1$ for the first layer. FIG. 7 shows the values of the remanent Kerr rotation angle measured by a laser beam of wavelength 400 nm incident from the glass substrate. This shows that the first layer is required to have a thickness of not less than 1 nm and not more than 20 nm in order to obtain a Kerr rotation angle of 0.3 or more degrees, suitable for practical use, as when the second layer is a rare earth-transition metal amorphous film.

Figure 8:
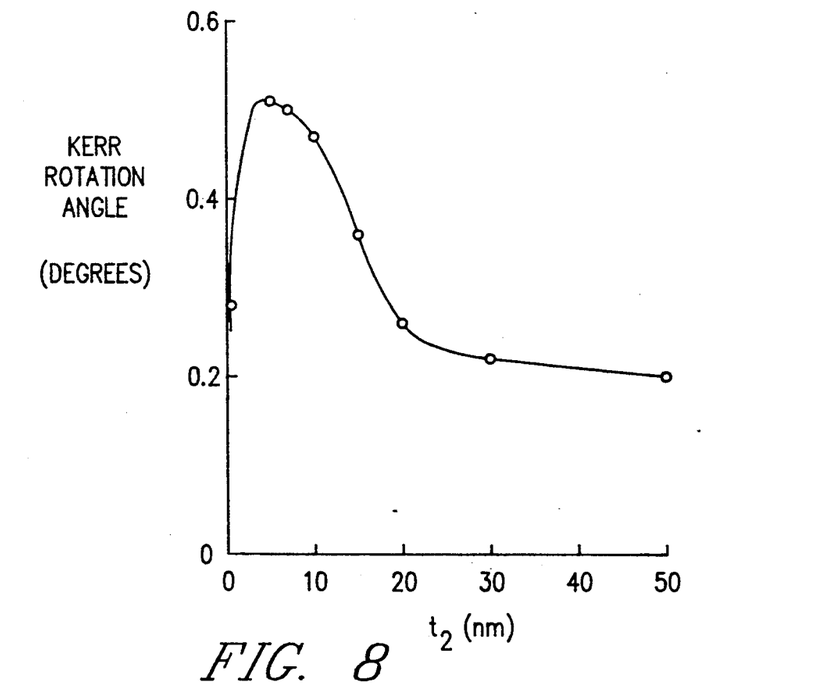
FIG. 8 is a graph showing the relationship between the thickness of the second layer and the Kerr rotation angle of a TbFeCo/Co/TbFeCo trilayer film.

Next, several kinds of samples were made in which $Tb_{18}Fe_{49}Co_{33}$ amorphous films were used for the first and third layers and a Co crystalline film for the second layer, with a constant thickness of 10 nm for the first layer, a constant thickness of 100 nm for the third layer, and a variable thickness $t_2$ for the second layer. FIG. 8 shows the values of the remanent Kerr rotation angle measured by a laser beam of wavelength 400 nm incident from the glass substrate. The figure shows that the second layer is required to have a thickness of not less than 1 nm and not more than 20 nm in order to obtain a Kerr rotation angle of 0.3 or more degrees, suitable for practical use, as when the second layer is a rare earth-transition metal amorphous film.

The other characteristics of $Tb_{21}Fe_{75}Co_4(t_1=5$ nm$)/Co(t_2=5$ nm$)/Tb_{21}Fe_{75}Co_4(t_3=100$ nm$)$ were as follows: coercivity=2 kOe, and Kerr rotation angle $\theta_k=0.4$ degrees (measured at 400 nm wavelength). The characteristics of $Tb_{21}Fe_{73}Co_6(t_1=7$ nm$)/Fe(t_2=7$ nm$)/Tb_{21}Fe_{73}Co_6(t_3=100$ nm$)$ were as follows: coercivity=3 kOe and Kerr rotation angle $\theta_k=0.35$ degrees (measured at 400 nm wavelength). The Kerr hysteresis loop in both triple-layered films had excellent squareness.

Experimental examples are shown in which the second layer is a crystalline alloy of Fe and Co. The characteristics of $Tb_{18}Fe_{49}Co_{33}(t_1=10$ nm$)/Fe_{70}Co_{30}(t_2=5$ nm$)/Tb_{18}Fe_{49}Co_{33}(t_3=100$ nm$)$ were as follows: coercivity=1.4 kOe, and Kerr rotation angle $\theta_k=0.45$ degrees (measured at 400 nm wavelength). The characteristics of $Tb_{18}Fe_{49}Co_{33}(t_1=20$ nm$)/Fe_{70}Co_{30}(t_2=5$ nm$)/Tb_{18}Fe_{49}Co_{33}(t_3=100$ nm$)$ were as follows: coercivity=1.9 kOe, and Kerr rotation angle $\theta_k=0.30$ degrees (measured at 400 nm wavelength). The characteristics of $Tb_{18}Fe_{49}Co_{33}(t_1=10$ nm$)/Fe_{50}Co_{50}(t_2=7$ nm$)/Tb_{18}Fe_{49}Co_{33}(t_3=100$ nm$)$ were as follows: coercivity=1.7 kOe, and Kerr rotation angle $\theta_k=0.40$ degrees (measured at 400 nm wavelength). All of the samples have high Kerr rotation at short wavelengths, and high coercivity, making them suitable for practical use. The Kerr hysteresis loop in both triple-layered films had excellent squareness.

Specific experimental examples have been given for various cases in which the first and third layers are TbFeCo alloy films and the second layer includes a rare earth element of a group consisting of Nd or Pr (hereafter called the Nd group).

A key objective of the present invention is to obtain a magneto-optical recording film with a high perpendicular magnetic anisotropy and a high Kerr rotation angle at short wavelengths, by sandwiching a magneto-optical recording film that has an in-plane magnetization but a high Kerr rotation angle at short wavelengths between magneto-optical recording films with a high perpendicular magnetic anisotropy (even with a low Kerr rotation angle at short wavelengths) and by optimizing their respective thickness. Therefore, any magneto-optical recording medium that has substantially the same characteristics as those of TbFeCo alloys may be used for the first and third layers. For instance, a GdTbFeCo film may be used for the first or third layer, since GdTbFeCo is not inferior to TbFeCo in Kerr rotation angle and perpendicular magnetic anisotropy, as shown by D. K. Hairston, et al. in FIG. 2 of "The TM dependence of the magneto-optic signal in GbTb-TM thin films," J. Appl. Phys. 63(8), Apr. 15, 1988, pp. 3621-3623. Further, evaluation of a DyTbFeCo disk and a TbFeCo disk in FIG. 4 of "Compositional dependence of recording noise in amorphous rare-earth-transition metal magneto-optical disks," J. Appl. Phys. 63(8), Apr. 15, 1988, pp. 3856-3858, shows that both are substantially equal in performance. In view of this, the TbFeCo film may also be replaced by a DyTbFeCo film. Moreover, as shown by Endo et al. in "Magnetic and magneto-optic properties of amorphous Dy-Fe-Co and Tb-Fe-Co films," Journal of the Magnetics Society of Japan, Vol. 8, No. 2, 1984, pp. 101-104, a DyFeCo film has magnetic and magneto-optical properties similar to those of a TbFeCo film. Therefore, a DyFeCo film may be used for the first or third layer instead of the TbFeCo film. As shown by Sumi et al. in "Read/write characteristics of GdDyFeCo magneto-optical disk," Digest of the 11th annual conference on magnetics in Japan (1987), P. 273, a GdDyFeCo film is a magneto-optical recording material that has substantially the same properties as those of a TbFeCo film. Therefore, the TbFeCo film may be replaced by a GdDyFeCo film.

At least one rare earth element selected from a group consisting of Tb, Dy, and Gd (hereafter called the Tb group) may be added to the second layer. This is because addition of an element of the Tb group to the second layer enhances the perpendicular magnetic anisotropy of the second layer itself and hence increases the perpendicular magnetic anisotropy of the entire trilayer film. However, if the additional amount of the Tb group element is excessive, the amount of the Nd group element becomes insufficient, and the second layer and hence the entire trilayer film cannot have a high Kerr rotation angle at short wavelengths. Therefore, the additional amount of the Tb group element should be not more than 90 atomic percent of all the rare earth elements. One example of a rare earth-transition metal amorphous film with an additional element of the Tb group that can be used for the second layer is an NdGdFeCo film. As shown by Ito et al. in FIG. 3 of "Magnetic and Magneto-optical properties of Nd alloy multilayers," Digest of the 13th annual conference on magnetics in Japan (1989),p. 325, a single-layered film of $Nd_5Gd_{22}(Fe_{68}Co_{32})_{73}$ actually has a Kerr rotation angle of 0.336 degrees at 400 nm. This is larger than the value of TbFeCo at 400 nm (approximately 0.2 degrees), and the shape of its spectrum demonstrates that the decrease in the Kerr rotation angle at short wavelengths is small. Therefore, it is expected that the use of this film as the second layer of the trilayer film according to the invention will also result in a sufficiently large Kerr rotation angle at a short wavelength range.

Another example of a rare earth-transition metal amorphous film with an additional element of the Tb group that can be used for the second layer is a NdTbFeCo film. As shown by Ota in FIG. 7 of "High density recording of optical memory," Journal of the Magnetics Society of Japan, Vol. 14, No. 4, 1990, pp. 617-623, and $Nd_{12}Tb_{16}Fe_{36}Co_{36}$ film has substantially the same properties as the NdGdFeCo film, and its use as the second layer is expected to result in a sufficiently large Kerr rotation angle at short wavelengths. A NdDyFeCo film may also be used for the second layer, because its magneto-optical properties do not vary much, even when Tb is replaced by Dy in the rare earth-transition metal amorphous layer, as described in the foregoing article by Endo et al.

Figure 9:
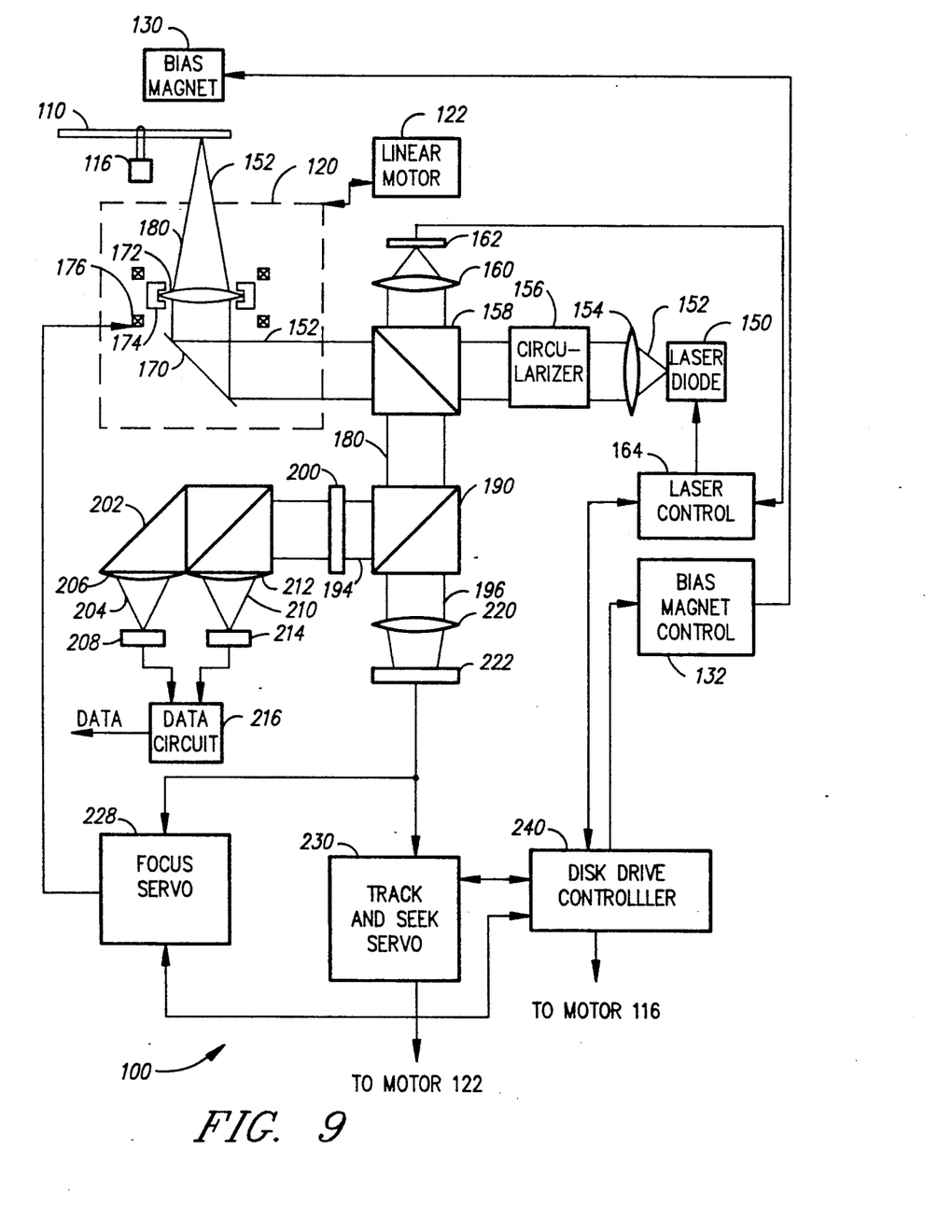
FIG. 9 is a schematic diagram of a magneto-optic disk drive system using the media of the present invention.

FIG. 9 is a schematic diagram of an optical data storage system of the present invention and is designated by the general reference number 100. System 100 uses an optical media disk 110 which is similar to the media as shown in FIG. 1. An optical head 120 is positioned below medium 110. Head 120 is moved in a radial direction relative to disk 110 by a linear motor 122. A bias magnet 130 is located above medium 110 and is connected to a magnet control 132.

A laser 150 produces a polarized light beam 152. Laser 150 is preferably a laser diode. Light beam 152 is collimated by a lens 154 and circularized by a circularizer 156. Circularizer 156 is preferably a prism.

Beam 152 passes to a beamsplitter 158. A portion of beam 152 is reflected toward a lens 160. Lens 160 focuses the light to a power monitor optical detector 162. Detector 162 is connected to a laser control 164. Detector 162 provides control 164 with a power monitor signal representative of the power level of beam 152 which is used to adjust the power of laser 150 as appropriate.

The remaining portion of beam 152 passes through beamsplitter 158 to a mirror 170. Mirror 170 reflects the light towards a focussing lens 172. Lens 172 focuses beam 152 onto the disk 110. Lens 172 is mounted in a lens holder 174. Holder 174 may be moved relative to disk 110 by an actuator motor 176. Mirror 170, lens 172, holder 174, and motor 176 are preferably located in the optical head 120.

A light beam 180 is reflected from the disk 110, passes through lens 172 and is reflected by mirror 170. A portion of the light beam 180 is then reflected by beamsplitter 158 to a beamsplitter 190. Beamsplitter 190 divides the beam 180 into a data beam 194 and a servo beam 196.

Data beam 194 passes through a quarter waveplate 200 to a polarizing beamsplitter 202. Beamsplitter 202 divides beam 194 into two orthogonal polarization components. A first polarization component beam 204 is focused by a lens 206 to a data detector 208. A second polarization component 210 is focussed to a lens 212 to a data optical detector 214. A data circuit 216 is connected to detectors 208 and 214 and generates a data signal representative of the data recorded on medium 110.

A servo beam 196 is focussed by a lens 220 onto a segmented optical detector 222, such as a spot size measuring detector as is known in the art. A focus servo 228, as is known in the art, is connected to detector 222 and motor 176. Servo 228 controls motor 176 to adjust the position of lens 172 as appropriate in order to maintain proper focus. A track and seek servo 230, as is known in the art, is connected to detector 222 and motor 122. Servo 230 causes motor 122 to adjust the position of head 120 as appropriate. A disk drive controller 240 as is known in the art, provides overall control for servo 228 and 230, as well as laser control 164 and magnet control 132.

The operation of system 100 may now be understood. During a write operation, controller 240 causes laser control 164 to energize laser 150 to provide a high powered polarized beam 152. Beam 152 is powerful enough to heat the medium 110 to above its Curie temperature. At the same time, controller 240 causes magnet control 132 to energize magnet 130. The laser 150 is pulsed responsive to the data to be recorded on the disk and the data is recorded on the disk as the changes in magnetic domain orientations.

During a read operation, controller 240 causes laser control 164 to energize laser 150 to generate a low power polarized beam 152. Beam 152 is focussed to medium 110. The low power beam does not heat medium 110 to above its Curie temperature. The reflected light 180 has its plane of polarization rotated one way or the other depending upon the magnetic domain orientations of the spots recorded on the medium 110. This is a result of the Kerr effect. These differences in polarization are detected by detectors 208 and 214, and data circuit 216 outputs a digitized data signal representative of the recorded data. Data circuit 216 is known in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magneto-optical medium comprising:
a first magnetic layer having a thickness $t_1$, where $1 \text{ nm} \leq t_1 \leq 20$ nm, comprising a rare earth-transition metal amorphous film including at least one rare earth element selected from a group consisting of Tb, Dy, and Gd, and including at least one transition metal element selected from a group consisting of Fe and Co;
a second magnetic layer overlying the first magnetic layer, having a thickness $t_2$, where $1 \text{ nm} \leq t_2 \leq 20$ nm, comprising a rare earth-transition metal amorphous film including at least one rare earth element selected from a group consisting of Nd and Pr, and including at least one transition metal element selected from a group consisting of Fe and Co; and
a third magnetic layer overlying the second magnetic layer, having a thickness $t_3$, where $2 \text{ nm} \leq t_3$, comprising a rare earth-transition metal amorphous film including at least one rare earth element selected from a group consisting of Tb, Dy and Gd, and including at least one transition metal element selected from a group consisting of Fe and Co.

2. The medium of claim 1, wherein the first and third layers are made of a material selected from the group consisting of TbFeCo, GdTbFeCo, DyTbFeCo, DyFeCo, and DyGdFeCo.

3. The medium of claim 1, wherein said first, second and third magnetic layers include at least one element selected from a group of transition metals for improving anti-corrosion.

4. The medium of claim 3, wherein said group of transition metals for improving anti-corrosion consists of Ti, Zr, V, Nb, Ta, Cr, Mo, W, Pd, Pt, Au, and Al.

5. A magneto-optical medium comprising:
a first magnetic layer having a thickness $t_1$, where $1 \text{ nm} \leq t_1 \leq 20$ nm, comprising a rare earth-transition metal amorphous film including at least one rare earth element selected from a group consisting of Tb, Dy, and Gd, and including at least one transition metal element selected from a group consisting of Fe and Co;
a second magnetic layer overlying the first magnetic layer, having a thickness $t_2$ where $1 \text{ nm} \leq t_2 \leq 20$ nm, comprising a crystalline film including at least one element selected from a group consisting of Fe and Co; and a third magnetic layer overlying the second magnetic layer, having a thickness $t_3$, where 2 nm$\leq t_3$, comprising a rare earth-transition metal amorphous film including at least one rare earth element selected from a group consisting of Tb, Dy and Gd, and including at least one transition metal element selected from a group consisting of Fe and Co.

6. The medium of claim 5, wherein the first and third layers are made of a material selected from the group consisting of TbFeCo, GdTbFeCo, DyTbFeCo, DyFeCo, and DyGdFeCo.

7. The medium of claim 5, wherein said first, second and third magnetic layers include at least one element selected from a group of transition metals for improving anti-corrosion.

8. The medium of claim 7, wherein said group of transition metals for improving anti-corrosion consists of Ti, Zr, V, Nb, Ta, Cr, Mo, W, Pd, Pt, Au, and Al.

9. A magneto-optical medium, comprising:
a first magnetic layer having a thickness $t_1$, where 1 nm$\leq t_1 \leq 20$ nm, comprising a rare earth-transition metal amorphous film including at least one rare earth element selected from a group consisting of Tb, Dy, and Gd, and including at least one transition metal element selected from a group consisting of Fe and Co;
a second magnetic layer overlying the first magnetic layer, having a thickness $t_2$, where 1 nm$\leq t_2 \leq 20$ nm, comprising a material represented by the formula $(A_{1-a}B_a)_x(Fe_{1-b}Co_b)_y T_z$, where A is at least one element selected from a group consisting of Nd and Pr, B is at least one element selected from a group consisting of Tb, Dy and Gd, T is at least one element selected from a group of transition metals for improving anti-corrosion, where $0 \leq a \leq 0.9$, $0 \leq b \leq 1$, $0 \leq x \leq 40$, $0 \leq z \leq 10$, and $x + y + z = 100$; and
a third magnetic layer overlying the second magnetic layer, having a thickness $t_3$, where 2 nm$\leq t_3$, comprising a rare earth-transition metal amorphous film including at least one rare earth element selected from a group consisting of Tb, Dy and Gd, and including at least one transition metal element selected from a group consisting of Fe and Co.

10. The medium of claim 9, wherein the first and third layers are made of a material selected from the group consisting of TbFeCo, GdTbFeCo, DyTbFeCo, DyFeCo, and DyGdFeCo.

11. The medium of claim 9, wherein said first, second and third magnetic layers include at least one element selected from a group of transition metals for improving anti-corrosion.

12. The medium of claim 11, wherein said group of transition metals for improving anti-corrosion consists of Ti, Zr, V, Nb, Ta, Cr, Mo, W, Pd, Pt, Au, and Al.

13. An optical data storage system comprising:
a radiation source for providing a first radiation beam;
a magneto-optical medium comprising a first magnetic layer having a thickness $t_1$, where 1 nm$\leq t_1 \leq 20$ nm, comprising a rare earth-transition metal amorphous film including at least one rare earth element selected from a group consisting of Tb, Dy, and Gd, and including at least one transition metal element selected from a group consisting of Fe and Co; a second magnetic layer overlying the first magnetic layer, having a thickness $t_2$, where 1 nm$\leq t_2 \leq 20$ nm, comprising a rare earth-transition metal amorphous film including at least one rare earth element selected from a group consisting of Nd and Pr, and including at least one transition metal element selected from a group consisting of Fe and Co; and a third magnetic layer overlying the second magnetic layer, having a thickness $t_3$, where 2 nm$\leq t_3$, comprising a rare earth-transition metal amorphous film including at least one rare earth element selected from a group consisting of Tb, Dy and Gd, and including at least one transition metal element selected from a group consisting of Fe and Co;
a radiation transmission means for directing the first radiation beam from the radiation source to the medium; and
a radiation reception means for receiving a second radiation beam from the medium and generating a data signal responsive thereto.

14. The medium of claim 13, wherein the first and third layers are made of a material selected from the group consisting of TbFeCo, GdTbFeCo, DyTbFeCo, DyFeCo, and DyGdFeCo.

15. The medium of claim 13, wherein said first, second and third magnetic layers include at least one element selected from a group of transition metals for improving anti-corrosion.

16. The medium of claim 15, wherein said group of transition metals for improving anti-corrosion consists of Ti, Zr, V, Nb, Ta, Cr, Mo, W, Pd, Pt, Au, and Al.

17. An optical data storage system comprising:
a radiation source for providing a first radiation beam;
a magneto-optical medium comprising a first magnetic layer having a thickness $t_1$, where 1 nm$\leq t_1 \leq 20$ nm, comprising a rare earth-transition metal amorphous film including at least one rare earth element selected from a group consisting of Tb, Dy, and Gd, and including at least one transition metal element selected from a group consisting of Fe and Co; a second magnetic layer overlying the first magnetic layer, having a thickness $t_2$ where 1 nm$\leq t_2 \leq 20$ nm, comprising a crystalline film including at least one element selected from a group consisting of Fe and Co; and a third magnetic layer overlying the second magnetic layer, having a thickness $t_3$, where 2 nm$\leq t_3$, comprising a rare earth-transition metal amorphous film including at least one rare earth element selected from a group consisting of Tb, Dy and Gd, and including at least one transition metal element selected from a group consisting of Fe and Co;
a radiation transmission means for directing the first radiation beam from the radiation source to the medium; and
a radiation reception means for receiving a second radiation beam from the medium and generating a data signal responsive thereto.

18. The medium of claim 17, wherein the first and third layers are made of a material selected from the group consisting of TbFeCo, GdTbFeCo, DyTbFeCo, DyFeCo, and DyGdFeCo.

19. The medium of claim 17, wherein said first, second and third magnetic layers include at least one element selected from a group of transition metals for improving anti-corrosion.

20. The medium of claim 19, wherein said group of transition metals for improving anti-corrosion consists of Ti, Zr, V, Nb, Ta, Cr, Mo, W, Pd, Pt, Au, and Al.

21. An optical data storage system comprising:
- a radiation source for providing a first radiation beam;
- a magneto-optical medium comprising a first magnetic layer having a thickness $t_1$, where $1 \text{ nm} \leq t_1 \leq 20 \text{ nm}$, comprising a rare earth-transition metal amorphous film including at least one rare earth element selected from a group consisting of Tb, Dy, and Gd, and including at least one transition metal element selected from a group consisting of Fe and Co; a second magnetic layer overlying the first magnetic layer, having a thickness $t_2$, where $1 \text{ nm} \leq t_2 \leq 20 \text{ nm}$, comprising a material represented by the formula $(A_{1-a}B_a)_x(Fe_{1-b}Co_b)_yT_z$, where A is at least one element selected from a group consisting of Nd and Pr, B is at least one element selected from a group consisting of Tb, Dy and Gd, T is at least one element selected from a group of transition metals for improving anti-corrosion, where $0 \leq a \leq 0.9$, $0 \leq b \leq 1$, $0 \leq x \leq 40$, $0 \leq z \leq 10$, and $x+y+z=100$; and a third magnetic layer overlying the second magnetic layer, having a thickness $t_3$, where $2 \text{ nm} \leq t_3$, comprising a rare earth-transition metal amorphous film including at least one rare earth element selected from a group consisting of Tb, Dy and Gd, and including at least one transition metal element selected from a group consisting of Fe and Co;
- a radiation transmission means for directing the first radiation beam from the radiation source to the medium; and
- a radiation reception means for receiving a second radiation beam from the medium and generating a data signal responsive thereto.

22. The medium of claim 21, wherein the first and third layers are made of a material selected from the group consisting of TbFeCo, GdTbFeCo, DyTbFeCo, DyFeCo, and DyGdFeCo.

23. The medium of claim 21, wherein said first, second and third magnetic layers include at least one element selected from a group of transition metals for improving anti-corrosion.

24. The medium of claim 23, wherein said group of transition metals for improving anti-corrosion consists of Ti, Zr, V, Nb, Ta, Cr, Mo, W, Pd, Pt, Au, and Al.

* * * * *